(12) United States Patent
Tanaka

(10) Patent No.: US 10,840,527 B2
(45) Date of Patent: Nov. 17, 2020

(54) POWER SUPPLY SYSTEM AND CONTROL METHOD THEREOF

(71) Applicant: NISSAN MOTOR CO., LTD., Yokohama (JP)

(72) Inventor: Koichi Tanaka, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/637,823

(22) PCT Filed: Aug. 14, 2017

(86) PCT No.: PCT/JP2017/029316
§ 371 (c)(1),
(2) Date: Feb. 10, 2020

(87) PCT Pub. No.: WO2019/035169
PCT Pub. Date: Feb. 21, 2019

(65) Prior Publication Data
US 2020/0168929 A1 May 28, 2020

(51) Int. Cl.
*H01M 8/04537* (2016.01)
*B60L 15/20* (2006.01)
(Continued)

(52) U.S. Cl.
CPC ..... *H01M 8/04611* (2013.01); *B60L 15/2045* (2013.01); *H01M 8/04544* (2013.01);
(Continued)

(58) Field of Classification Search
CPC ......... H01M 8/04611; H01M 8/04544; H01M 8/04674; H01M 8/046626;
(Continued)

(56) References Cited

U.S. PATENT DOCUMENTS

2004/0136211 A1   7/2004 Itou
2004/0217732 A1   11/2004 Zhu et al.
(Continued)

FOREIGN PATENT DOCUMENTS

JP   2004-87403 A    3/2004
JP   2004-222376 A   8/2004
(Continued)

*Primary Examiner* — Robert L Deberadinis
(74) *Attorney, Agent, or Firm* — Foley & Lardner LLP

(57) ABSTRACT

A power supply system comprising: power storage device (1); a fuel cell (2) connecting to the power storage device (1); an auxiliary machine (4) of the fuel cell, the auxiliary machine (4) operating in a range corresponding to a voltage across the fuel cell (2); a voltage converter (3) inserted along a first line between the fuel cell (2) and the power storage device (1). The power supply system further comprising an auxiliary machine power supplying device (5) inserted between the voltage converter (3) and the power storage device (1), the power supply device for the auxiliary machine (5) being configured to supply power from at least one of the fuel cell (2) and the power storage device (1) to the auxiliary machine (4); and a switch (6) inserted along a second line different from the first line between the fuel cell (2) and the auxiliary machine (4), the switch (6) being configured to supply power to the auxiliary machine (4).

18 Claims, 9 Drawing Sheets

(51) Int. Cl.
*H01M 8/04858* (2016.01)
*H01M 8/04828* (2016.01)

(52) U.S. Cl.
CPC ... *H01M 8/04574* (2013.01); *H01M 8/04626* (2013.01); *H01M 8/04932* (2013.01); *H01M 8/04947* (2013.01); *B60L 2210/10* (2013.01); *H01M 2250/20* (2013.01)

(58) Field of Classification Search
CPC ......... H01M 8/04932; H01M 8/04947; H01M 2250/20; B60L 15/2045; B60L 2210/10
See application file for complete search history.

(56) References Cited

U.S. PATENT DOCUMENTS

| | | |
|---|---|---|
| 2013/0057292 A1 | 3/2013 | Hasegawa et al. |
| 2015/0217660 A1 | 8/2015 | Manabe et al. |

FOREIGN PATENT DOCUMENTS

| | | |
|---|---|---|
| JP | 2008-166042 A | 7/2008 |
| JP | 2009-181797 A | 8/2009 |
| JP | 2011-216429 A | 10/2011 |
| JP | 2012-130207 A | 7/2012 |
| JP | 2016-103931 A | 6/2016 |
| WO | WO 2014/013606 A1 | 1/2014 |

POWER SUPPLY SYSTEM AND CONTROL METHOD THEREOF

TECHNICAL FIELD

The present invention relates to a power supply system configured to supply an auxiliary machine of a fuel cell with power from a power storage device, and relates to a control method of such a power supply system.

BACKGROUND ART

WO2014/013606A discloses a system including a first converter and a second converter as feeding devices to supply an auxiliary machine of a fuel cell with power, the first converter converting voltage across a secondary battery and supplying the auxiliary machine with power, the second converter boosting voltage across a fuel cell and supplying the auxiliary machine with power.

SUMMARY OF INVENTION

Such a system supplies the auxiliary machine with power via the first converter at the time of starting-up of the fuel cell and supplies the auxiliary machine with power via the second converter after the starting-up. This means that power-supplying to the auxiliary machine generates power loss due to voltage conversion at the first converter and the second converter. This power loss wastes the fuel for the fuel cell, and so leads to a problem of degrading the fuel consumption in the vehicle.

Focusing attention on such a problem, the present invention aims to provide a power supply system capable of keeping the fuel consumption in the vehicle while reliably starting up the fuel cell as well and provide a control method for such a power supply system.

According to one of the embodiments of a power supply system has a power storage device; a fuel cell connecting to the power storage device; an auxiliary machine of the fuel cell, the auxiliary machine operating in a range corresponding to a voltage across the fuel cell; and a voltage converter inserted along a first line between the fuel cell and the power storage device. The power supply system further has an auxiliary machine power supplying device inserted between the voltage converter and the power storage device, the power supply device for the auxiliary machine being configured to supply power from at least one of the fuel cell and the power storage device to the auxiliary machine; and a switch inserted along a second line different from the first line between the fuel cell and the auxiliary machine, the switch being configured to supply power to the auxiliary machine.

DESCRIPTION OF EMBODIMENTS

The following describes embodiments of the present invention, with reference to the attached drawings.

First Embodiment

Figure 1:
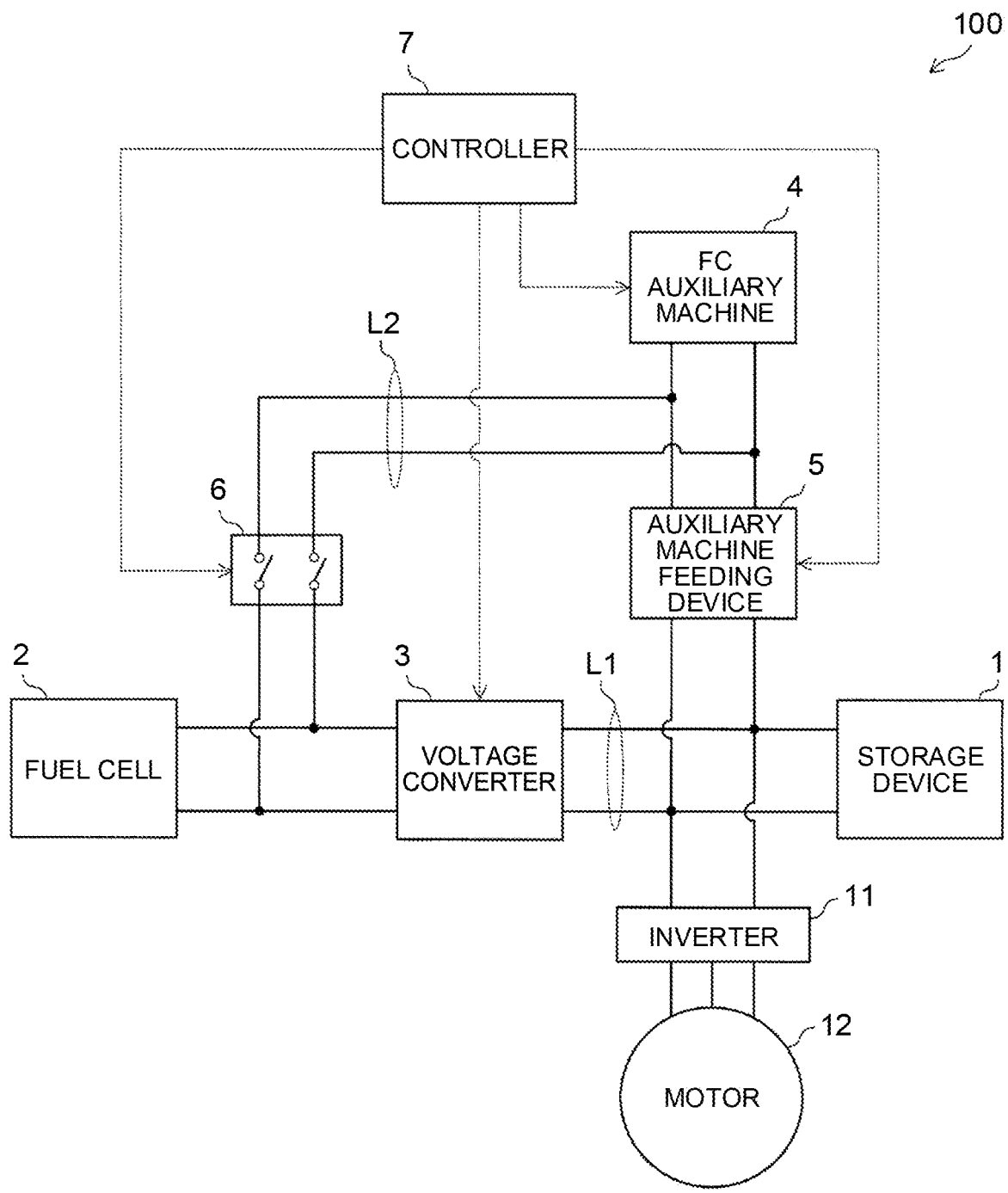
FIG. 1 shows an example of the configuration of a vehicle system in a first embodiment of the present invention.

FIG. 1 shows one example of the configuration of a vehicle system 100 that is a first embodiment of the present invention.

The vehicle system 100 is a power supply system to supply an auxiliary machine and a power storage device mounted on a vehicle with power. Examples of the vehicle includes electric vehicles, such as a hybrid vehicle, and electric trains. The vehicle system 100 of the present embodiment supplies a motor 12 to drive a vehicle with power via an inverter 11 to convert DC power into AC power.

The vehicle system 100 includes a power storage device 1, a fuel cell 2, a voltage converter 3, a FC auxiliary machine 4, a auxiliary machine power supplying device 5, a switch 6, a controller 7, the inverter 11, and the motor 12. The fuel cell 2, the voltage converter 3, the FC auxiliary machine 4, and the auxiliary machine power supplying device 5 make up a fuel cell system.

The power storage device 1 is a power supply to supply at least one of the FC auxiliary machine 4 and the motor 12 with power. In one example, the power storage device 1 outputs power with DC voltage at a few hundreds of volt (V). The power storage device 1 may be a lithium ion battery or a lead battery.

The fuel cell 2 connects to the power storage device 1 via a first line L1. The fuel cell 2 connects to the FC auxiliary machine 4 via a second line L2 that is different from the first line L1. The fuel cell 2 generates power while receiving supplied fuel gas and oxidant gas. The fuel cell 2 may be a solid oxide fuel cell or a solid polymer fuel cell. The output voltage from the fuel cell 2 changes with some operating states, including the flow rate of fuel gas supplied to the fuel cell 2, the flow rate of the oxidant gas, and the temperature of the fuel cell 2.

The fuel cell 2 is a power supply capable of supplying power to at least one of the power storage device 1, the FC auxiliary machine 4, and the motor 12. The fuel cell 2 includes the lamination of a plurality of cells, and outputs a voltage that is different from the output voltage from the power storage device 1. In one example, the fuel cell 2 outputs DC voltage of a few tens of V that is lower than the output voltage from the power storage device 1. In this example, the fuel cell 2 operates as a supplemental power supply for the output from the power storage device 1.

The voltage converter 3 is inserted along the first line L1 between the fuel cell 2 and the power storage device 1, and converts the voltage of power output from the fuel cell 2 into a different voltage value. In one example, the voltage converter 3 includes a DC/DC converter to boost or step-down the voltage of input power and output the voltage.

The FC auxiliary machine 4 is an ancillary device required for power generation of the fuel cell 2. Examples of the FC auxiliary machine 4 include an actuator to supply oxidant gas or fuel gas to the fuel cell 2 and an actuator to introduce refrigerant into the fuel cell 2 and return the refrigerant to the entrance of the fuel cell 2 for circulation. Specific examples of the FC auxiliary machine 4 include a blower or a compressor to supply ambient air as oxidant gas to the fuel cell 2.

The FC auxiliary machine 4 operates within the range of voltage values corresponding to the output voltage from the fuel cell 2. In other words, the FC auxiliary machine 4 is designed to run within the range of voltage values output from the fuel cell 2. The rated output from the FC auxiliary machine 4 is determined while considering the rated output from the fuel cell 2. In one example, a smaller rated output from the FC auxiliary machine 4 is determined for a smaller rated output from the fuel cell 2.

The auxiliary machine power supplying device 5 is inserted between the voltage converter 3 and the power storage device 1. The auxiliary machine power supplying device 5 supplies output power from at least one of the power storage device 1 and the fuel cell 2 to the FC auxiliary machine 4. In one example, the auxiliary machine power supplying device 5 includes a DC/DC converter to convert voltage between the voltage converter 3 and the power storage device 1 into a value within the operating voltage range of the FC auxiliary machine 4. In this example, the controller 7 controls the operation of the auxiliary machine power supplying device 5.

When voltage conversion is not necessary between the voltage converter 3 and the power storage device 1, the auxiliary machine power supplying device 5 may be omitted, and a power-supply line may branch off from the first line L1 between the voltage converter 3 and the power storage device 1 so as to directly connect to the FC auxiliary machine 4. In this case, the power-supply line can function as the auxiliary machine power supplying device 5.

The switch 6 directly connects or disconnects the second line L2 between the fuel cell 2 and the FC auxiliary machine 4. The switch 6 may include a mechanical switch, or may include an electrical device, such as a semiconductor switch or a diode. The switch 6 changes the power supplying device to the FC auxiliary machine 4 from the auxiliary machine power supplying device 5 to the fuel cell 2. In this way the switch 6 switches the power supply device to the FC auxiliary machine 4 between the auxiliary machine power supplying device 5 and the fuel cell 2. The controller 7 controls the connection of the switch 6.

The controller 7 controls the operation of the vehicle system 100. The controller 7 controls the voltage converter 3, the FC auxiliary machine 4, the auxiliary machine power supplying device 5 and the switch 6. Detecting a switching operation with a starting key of the vehicle by the driver from OFF to ON, the controller 7 executes start-up operation of the fuel cell 2.

In this start-up operation, the controller 7 disconnects the fuel cell 2 and the FC auxiliary machine 4, and controls the operation of the auxiliary machine power supplying device 5 so as to supply power to the FC auxiliary machine 4 from the power storage device 1. The controller 7 in the present embodiment sets the switch 6 at a disconnection state, and steps down the output voltage value of the power storage device 1 to the operating voltage value of the FC auxiliary machine 4. This activates the FC auxiliary machine 4, and the FC auxiliary machine 4 then supplies oxidant gas and fuel gas to the fuel cell 2 and warms up the fuel cell 2.

When the power of the fuel cell 2 exceeds the power required to activate the FC auxiliary machine 4, the controller 7 controls the state of the switch 6 so as to connect the fuel cell 2 and the FC auxiliary machine 4. The controller 7 then controls the operation of the auxiliary machine power supplying device 5 so as to stop the power supply from the auxiliary machine power supplying device 5 to the FC auxiliary machine 4.

The present embodiment describes the example of, following a detection of the switching operation with the starting key, executing the start-up operation of the fuel cell 2. In another embodiment, when the storage amount of the power storage device 1 falls below a predetermined threshold, the controller 7 may execute the start-up operation of the fuel cell 2. In one example, such a storage amount of the power storage device 1 may be SOC (State Of Charge).

Figure 2:
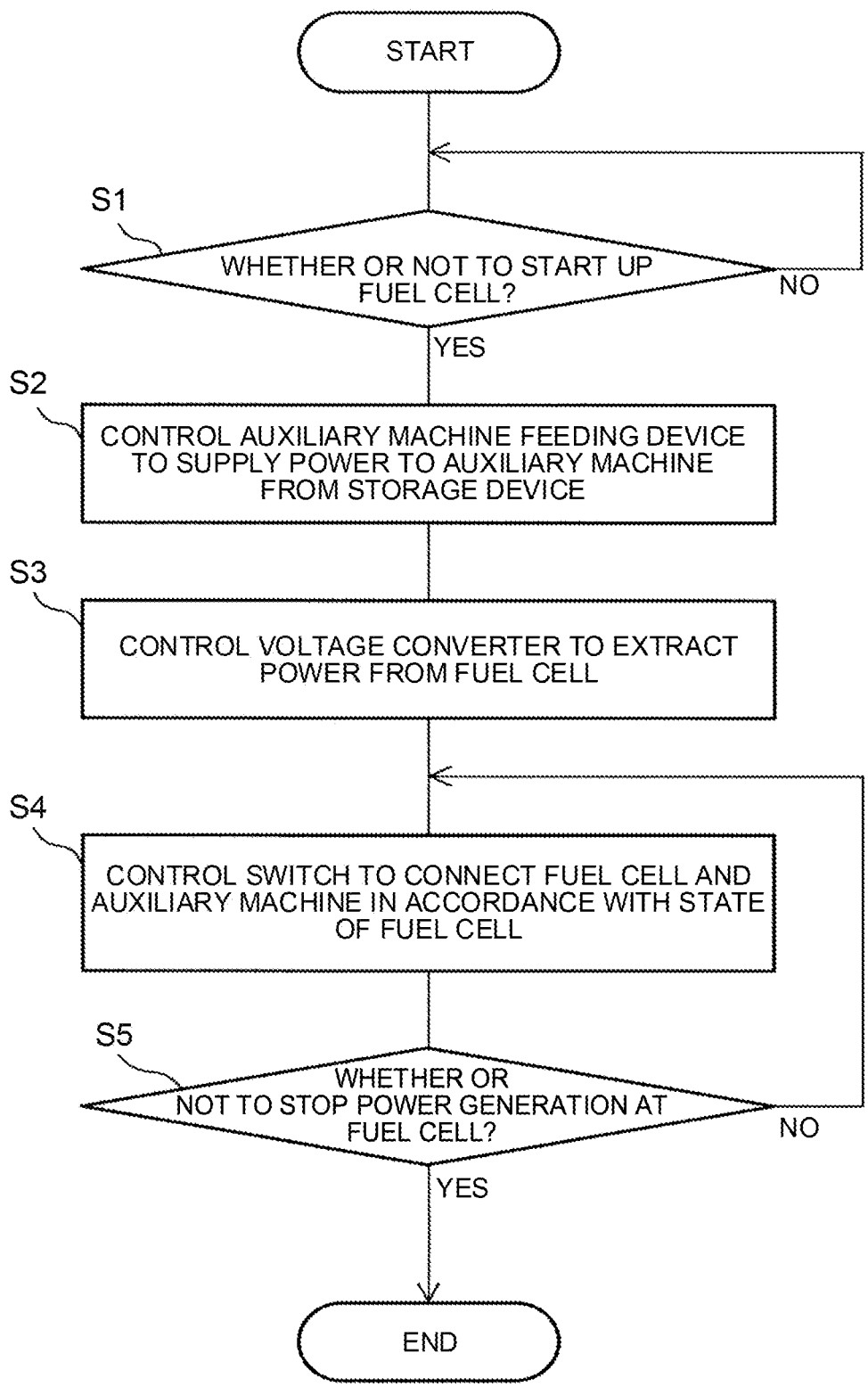
FIG. 2 is a flowchart showing an example of the procedure for the control method of a vehicle system.

FIG. 2 is a flowchart showing an example of the procedure for the control method of a vehicle system 100 by the controller 7 of the present embodiment.

At step S1, the controller 7 determines whether a start-up request for the fuel cell 2 is received or not, i.e., whether or not to start up the fuel cell 2. In one example, when the operation to turn the starting key of the vehicle ON or a decrease of the SOC of the power storage device 1 less than a predetermined value is detected, the controller 7 receives a signal of such a detection as the start-up request for the fuel cell 2.

At step S2, the controller 7 controls the operation of the auxiliary machine power supplying device 5 so as to supply power to the FC auxiliary machine 4 from the power storage device 1 to start up the fuel cell 2. In one example, when the SOC of the power storage device 1 falls below a predetermined threshold, the controller 7 controls to convert the output voltage from the power storage device 1 to a value in the voltage range where the FC auxiliary machine 4 is operable.

At step S3, the controller 7 controls the operation of the voltage converter 3 so as to extract power from the fuel cell 2. Specifically the controller 7 may measure the temperature of the fuel cell 2 or the elapsed time after the starting up, and when the measurement exceeds a predetermined threshold indicating that the fuel cell 2 is able to generate power, the controller 7 then controls to convert the output voltage from the fuel cell 2 and supply it to the power storage device 1.

Alternatively the controller 7 may obtain the amount of power generated at the fuel cell 2 based on the supplying amount of the fuel gas and the oxidant gas to the fuel cell 2, and when the amount of generated power exceeds a certain value, the controller 7 may control to charge the power storage device 1 with the power from the fuel cell 2 via the voltage converter 3.

At step S4, the controller 7 controls the state of the switch 6 so as to connect the fuel cell 2 and the FC auxiliary machine 4 in accordance with the operating state of the fuel cell 2.

In one example, the controller 7 may obtain a detection value or an estimated value of the temperature, the power, the voltage or the like of the fuel cell 2, and determine whether the obtained value exceeds a certain threshold or not. The certain threshold indicates the state of the fuel cell 2, such as the temperature, the power, or the voltage, where the output power from the fuel cell 2 suffices for the requested power for the FC auxiliary machine 4. When the obtained value exceeds the certain threshold, the controller 7 changes the switch 6 from the disconnection state (non-conducting state) to the connection state (conducting state).

At step S5, the controller 7 determines whether a stop request for the fuel cell 2 is received or not, i.e., whether or not to stop power generation at the fuel cell 2. In one example, when the operation to turn the starting key of the vehicle OFF, a decrease of the temperature of the fuel cell 2 below a lower-limit temperature, or an increase of the SOC of the power storage device 1 to a predetermined threshold indicating the full charging state of the power storage device 1 is detected, the controller 7 receives a signal of such a detection as the stop request for the fuel cell 2.

Then the controller 7 stops the power generation at the fuel cell 2 and changes the switch 6 from the connection state to the disconnection state. Then the controller 7 ends a series of procedure for the control method of the vehicle system 100.

According to the first embodiment of the present invention, the vehicle system 100 includes: the power storage device 1 mounted on a vehicle; the fuel cell 2 connecting to the power storage device 1; the FC auxiliary machine 4 operating in a range corresponding to the output voltage from the fuel cell 2; and the voltage converter 3 inserted along the first line L1 between the fuel cell 2 and the power storage device 1. The vehicle system 100 includes the auxiliary machine power supplying device 5 inserted between the voltage converter 3 and the power storage device 1 to supply power from at least one of the fuel cell 2 and the power storage device 1 as the power supplies to the FC auxiliary machine 4. The vehicle system 100 includes the switch 6 inserted along the second line L2 between the fuel cell 2 and the FC auxiliary machine 4 to enable power-supply to the FC auxiliary machine 4. The switch 6 connects the fuel cell 2 and the FC auxiliary machine 4 so as to change the power supplying device to the FC auxiliary machine 4 from the auxiliary machine power supplying device 5 to the fuel cell 2.

In this way the vehicle system 100 includes the auxiliary machine power supplying device 5 between the power storage device 1 and the voltage converter 3, and so enables power supplying to the FC auxiliary machine 4 from the power storage device 1 irrespective of the power-generating state of the fuel cell 2 so as to reliably operate the FC auxiliary machine 4 at the starting-up of the fuel cell 2.

The FC auxiliary machine 4, which operates at the voltage corresponding to the output voltage from the fuel cell 2, enables direct power-supplying from the fuel cell 2 to the FC auxiliary machine 4 via the switch 6. This means that, when the power is supplied to the FC auxiliary machine 4 via the voltage converter 3, the fuel cell 2 and the FC auxiliary machine 4 may be connected so as to reduce power loss due to the voltage conversion at the voltage converter 3.

This suppresses consumption of the fuel gas, which is to be used for power generation at the fuel cell 2, for the voltage conversion of the vehicle system 100, and so suppresses a decrease in fuel consumption in the vehicle.

Second Embodiment

Figure 3:
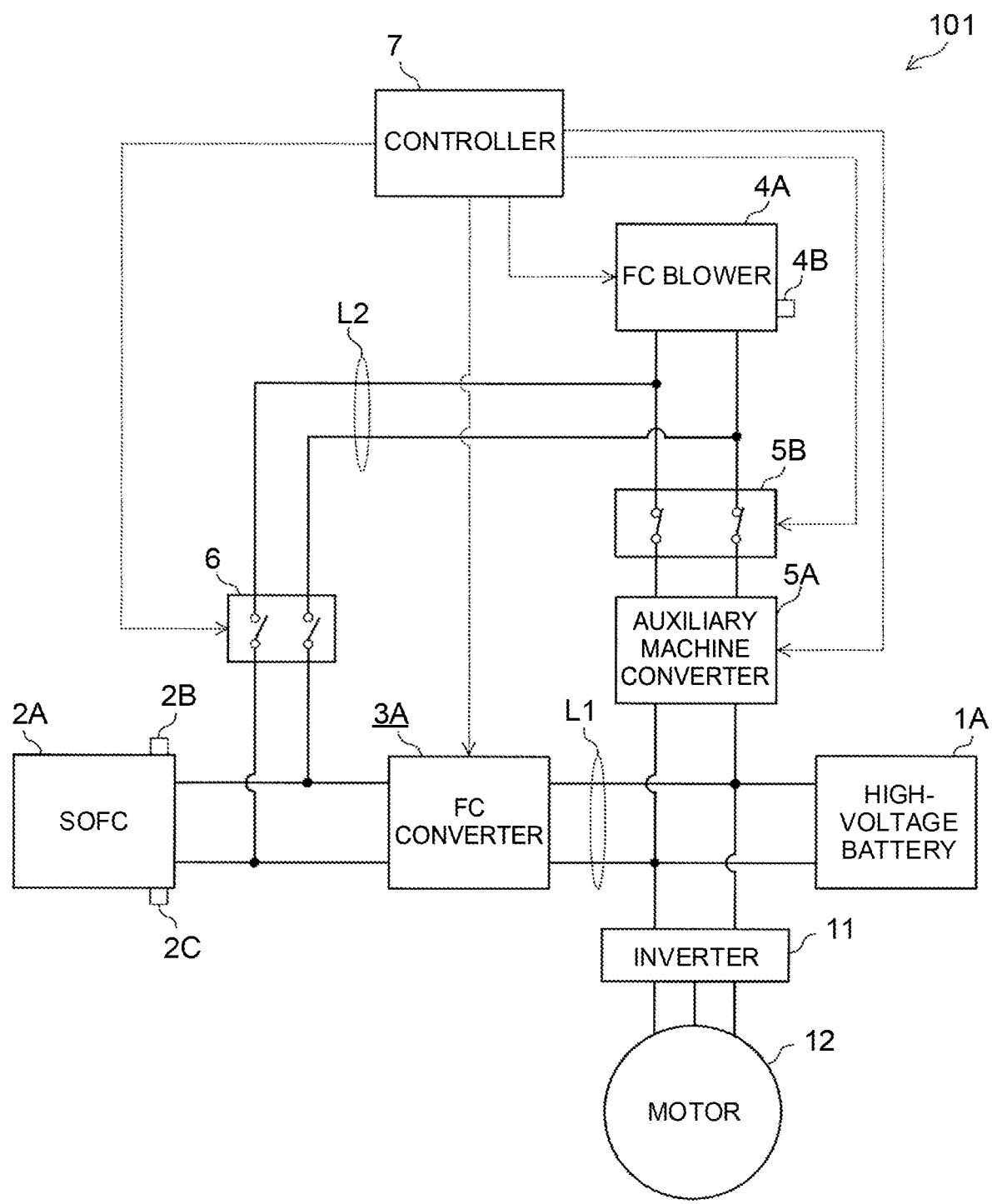
FIG. 3 shows an example of the configuration of a vehicle system in a second embodiment of the present invention.

FIG. 3 shows one example of the configuration of a vehicle system 101 that is a second embodiment of the present invention.

The vehicle system 101 includes a high-voltage battery 1A, a SOFC 2A, a FC output sensor 2B, a FC temperature sensor 2C, and a FC converter 3A. The vehicle system 101 also includes a FC blower 4A, a temperature sensor 4B, an auxiliary machine converter 5A, a feeding switch 5B, a switch 6, and a controller 7. The switch in this embodiment has the same configuration as that in the vehicle system 100 in FIG. 1, and so the following assigns the same reference numeral 6 to the switch and omits the descriptions on the switch.

The high-voltage battery 1A corresponds to the power storage device 1 in FIG. 1. The high-voltage battery 1A outputs a voltage higher than the output voltage from the SOFC 2A. The high-voltage battery 1A in the present embodiment outputs a DC voltage higher than 60 V. In one example, the high-voltage battery 1A outputs a DC voltage at about 400 V.

The SOFC 2A corresponds to the fuel cell 2 in FIG. 1. The SOFC 2A is a solid oxide fuel cell. The SOFC 2A of the present embodiment outputs a DC voltage at a few tens of V.

Preferably the upper-limit voltage of the SOFC 2A is less than 60 V. This is because, considering the safety regulations to prevent a direct contact (electric shot), both of the positive-electrode terminal and the negative-electrode terminal of the SOFC 2A have to float from the vehicle chassis when the upper-limit voltage of the SOFC 2A is equal to or larger than 60 V.

On the contrary, when the upper-limit voltage of the SOFC 2A is less than 60 V, the negative-electrode terminal of the SOFC 2A can be grounded to the chassis. Such a connection of the negative-electrode terminal of the SOFC 2A to the chassis allows the chassis to function as a path for electricity. This simplifies the circuit configuration of the vehicle system 101 as compared with the configuration having the SOFC 2A floating from the chassis.

The FC output sensor 2B detects voltage and current output from the SOFC 2A. The FC output sensor 2B outputs a detection signal indicating each of the detected output voltage and output current to the controller 7.

The FC temperature sensor 2C detects the temperature of the SOFC 2A. In one example, the FC temperature sensor 2C detects a temperature of gas supplied to the fuel cell 2 or a temperature of gas discharged from the fuel cell 2. The FC temperature sensor 2C outputs a detection signal indicating the detected temperature to the controller 7.

The FC converter 3A corresponds to the voltage converter 3 in FIG. 1. Based on the voltage of power output from the SOFC 2A, the FC converter 3A boosts or steps down a secondary voltage between the FC converter 3A and the high-voltage battery 1A. The FC converter 3A may include a mono-directional DC/DC converter, for example. This simplifies the FC converter 3A.

The FC blower 4A corresponds to the FC auxiliary machine 4 in FIG. 1. The FC blower 4A is an actuator to supply air as oxidant gas to the SOFC 2A. The operable range of voltage value for the FC blower 4A is designed in the range from 30 V to 50 V, for example.

The temperature sensor 4B detects the temperature of the FC blower 4A. The temperature sensor 4B of the present embodiment detects the temperature of a drive motor making up the FC blower 4A. The temperature sensor 4B outputs a detection signal indicating the detected temperature to the controller 7.

The auxiliary machine converter 5A corresponds to the auxiliary machine power supplying device 5 in FIG. 1. The auxiliary machine converter 5A is a DC/DC converter to convert the voltage between the high-voltage battery 1A and the FC converter 3A into a value within the operable voltage range of the FC blower 4A. In one example, the auxiliary machine converter 5A steps down the voltage between the high-voltage battery 1A and the FC converter 3A at about 400 V to 48 V.

The feeding switch 5B connects or disconnects the FC blower 4A and the auxiliary machine converter 5A. The controller 7 controls the connection of the feeding switch 5B. In one example, when the switch 6 changes from the disconnection state to the connection state, the feeding switch 5B changes from the connection state of the disconnection state. When the switch 6 changes from the connection state to the disconnection state, the feeding switch 5B changes from the disconnection state of the connection state. Similarly to the switch 6, the feeding switch 5B may include a mechanical switch, or may include an electrical device, such as a semiconductor switch or a diode.

Referring next to FIG. 4A to FIG. 4E, the following describes the way of supplying power to the FC blower 4A in the vehicle system 101. For the sake of simplicity, FIG. 4A to FIG. 4E omit the feeding switch 5B.

Figure 4A:
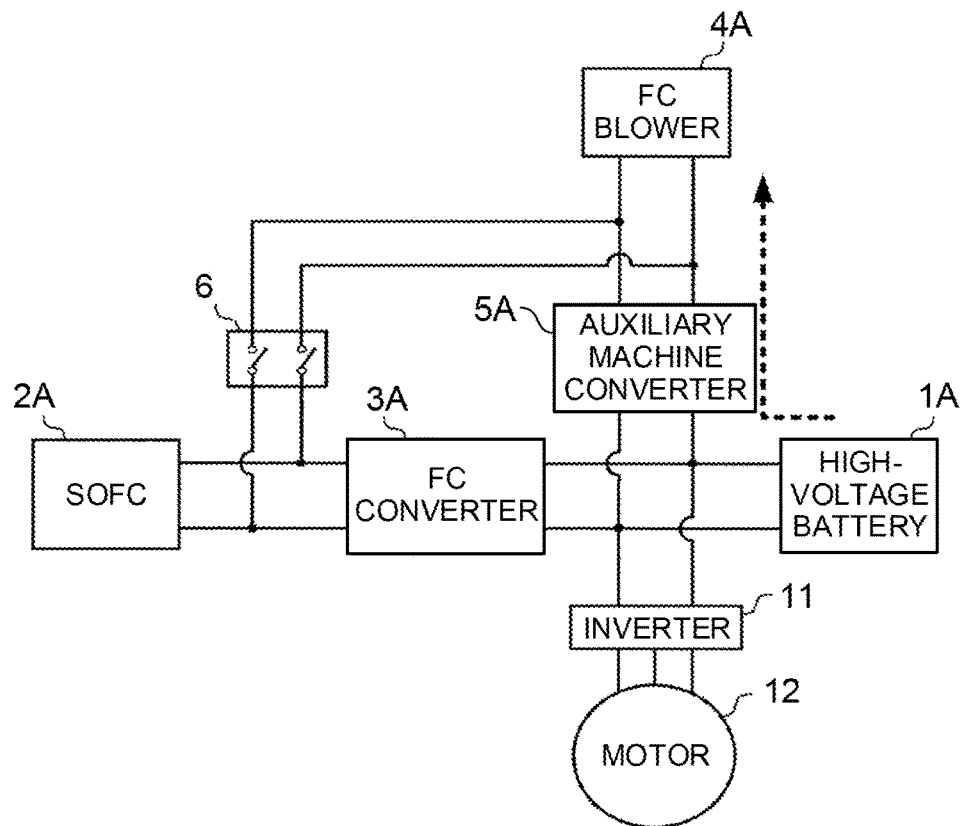
FIG. 4A shows a first auxiliary machine feeding state to supply power to the auxiliary machine of the fuel cell from the battery via the converter when the fuel cell starts to operate.

FIG. 4A describes the power feeding state to the FC blower 4A when the starting-up of the SOFC 2A starts.

In FIG. 4A, following the turning of the starting key of the vehicle ON, the start-up operation of the fuel cell is executed. Along with this, the auxiliary machine converter 5A steps down the output voltage from the high-voltage battery 1A to the operating voltage of the FC blower 4A, e.g., to 48 V. This supplies the output power from the high-voltage battery 1A to the FC blower 4A via the auxiliary machine converter 5A to activate the FC blower 4A, and the FC blower 4A supplies air to the SOFC 2A.

Figure 4B:
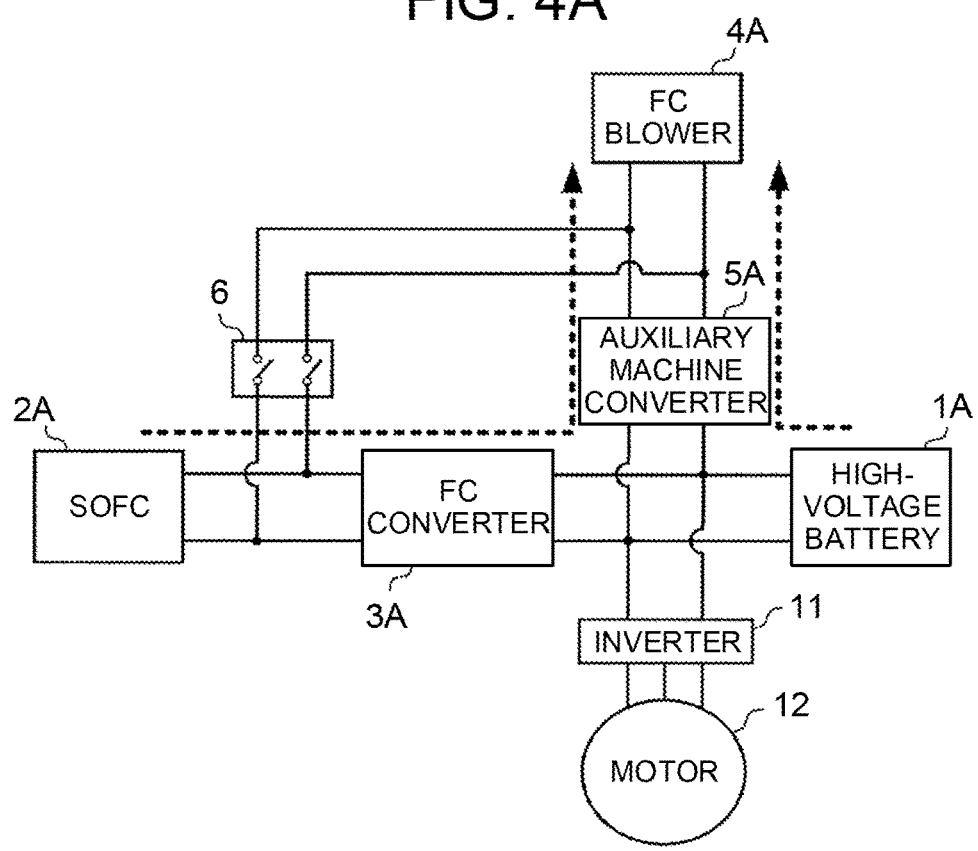
FIG. 4B shows a second auxiliary machine feeding state to supply power to the auxiliary machine from both of the fuel cell and the battery via the converter when the fuel cell starts power generation.

FIG. 4B describes the power feeding state to the FC blower 4A when power is extracted from the SOFC 2A.

In FIG. 4B, following a determination by the controller 7 that the SOFC 2A is ready for power generation, the FC converter 3A starts to operate. This boosts the output voltage from the SOFC 2A, e.g., a voltage value in the range from 30 V to 50 V, to a voltage value required for charging of the high-voltage battery 1A. Then the vehicle system supplies the power of the SOFC 2A to the FC blower 4A via the FC converter 3A and the auxiliary machine converter 5A.

The controller 7 determines that the SOFC 2A becomes ready for power generation when the temperature of the SOFC 2A rises to a temperature suitable for power generation and when the supplying amount of each of the oxidant gas and the fuel gas to the SOFC 2A reaches the flow rate required for power generation, for example.

Figure 4C:
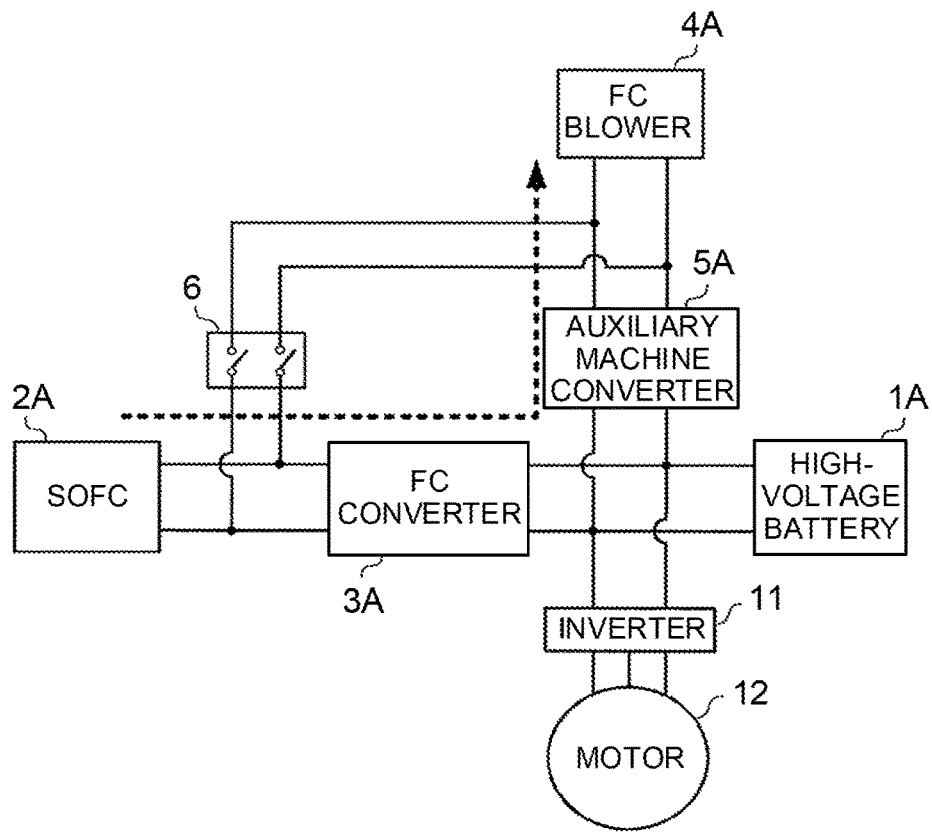
FIG. 4C shows a third auxiliary machine feeding state to supply power to the auxiliary machine from the fuel cell via the converter as the temperature of the fuel cell rises.

FIG. 4C describes the power feeding state to the FC blower 4A when the power that the SOFC 2A can generate exceeds the requested power for the FC blower 4A.

In FIG. 4C, the power of the SOFC 2A suffices for the supplying power to the FC blower 4A, and so the vehicle system supplies output power from the SOFC 2A to the FC blower 4A via the FC converter 3A and the auxiliary machine converter 5A without using the power of the high-voltage battery 1A.

Figure 4D:
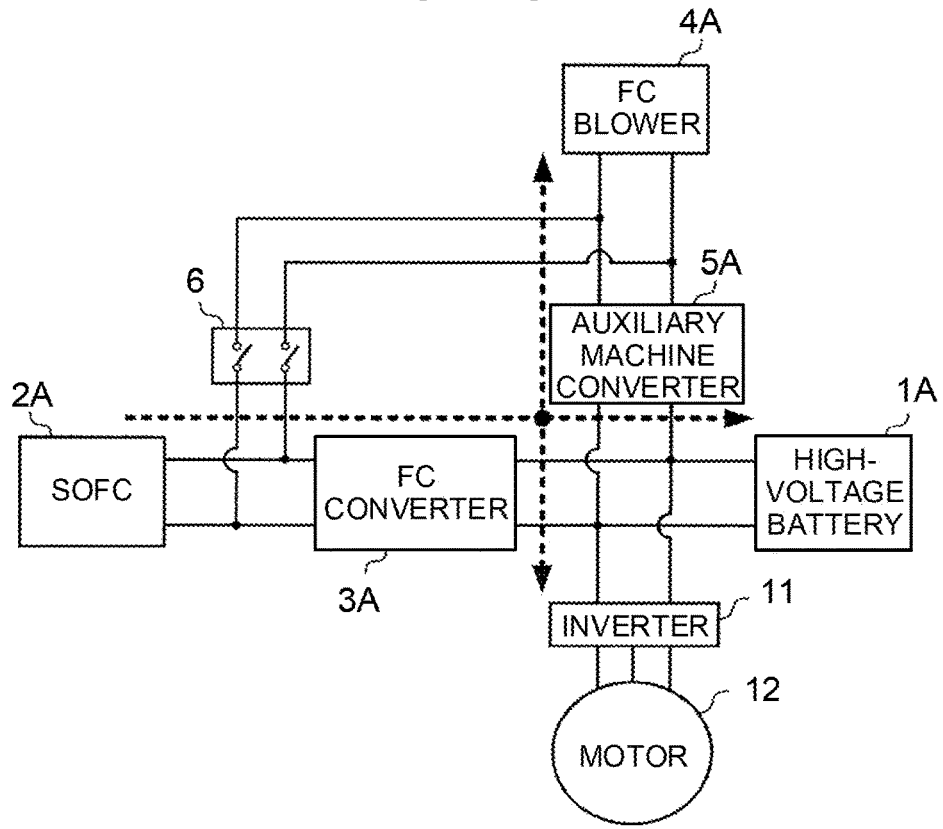
FIG. 4D shows a fourth auxiliary machine feeding state to distribute the power at the fuel cell to the auxiliary machine and other devices when the fuel cell is ready for the rated operation.

FIG. 4D describes the power feeding state to the FC blower 4A when externally requested power for the SOFC 2A is greater than 0 that is required from an external load different from the FC blower 4A making up the fuel cell system.

In FIG. 4D, the required power from both of the high-voltage battery 1A and the motor 12 that are external loads is greater than 0, so that the output power from the SOFC 2A extracted by the FC converter 3A increases. As a result the vehicle system supplies the output power from the SOFC 2A to the FC blower 4A, and distributes this output power to the inverter 11 and the high-voltage battery 1A as well.

For example, when the vehicle travels at a constant speed, the vehicle system supplies the output power from the SOFC 2A not only to the FC blower 4A but also to the high-voltage battery 1A and the motor 12.

The controller determines whether or not to supply power to the load based on the temperature of the SOFC 2A and the IV characteristics, for example. To acquire the IV characteristics of the SOFC 2A, the controller 7 obtains current values and voltage values of the SOFC 2A every time the controller 7 controls the FC blower 4A to change the output current from the SOFC 2A in a stepwise fashion. The controller 7 then estimates the IV characteristics by applying at least two sets of the current values and the voltage values to a predetermined approximate expression. Alternatively the controller 7 may store different IV characteristics in association with various temperatures of the SOFC 2A, and may select the IV characteristics corresponding to the temperature detected by the FC temperature sensor 2C.

Figure 4E:
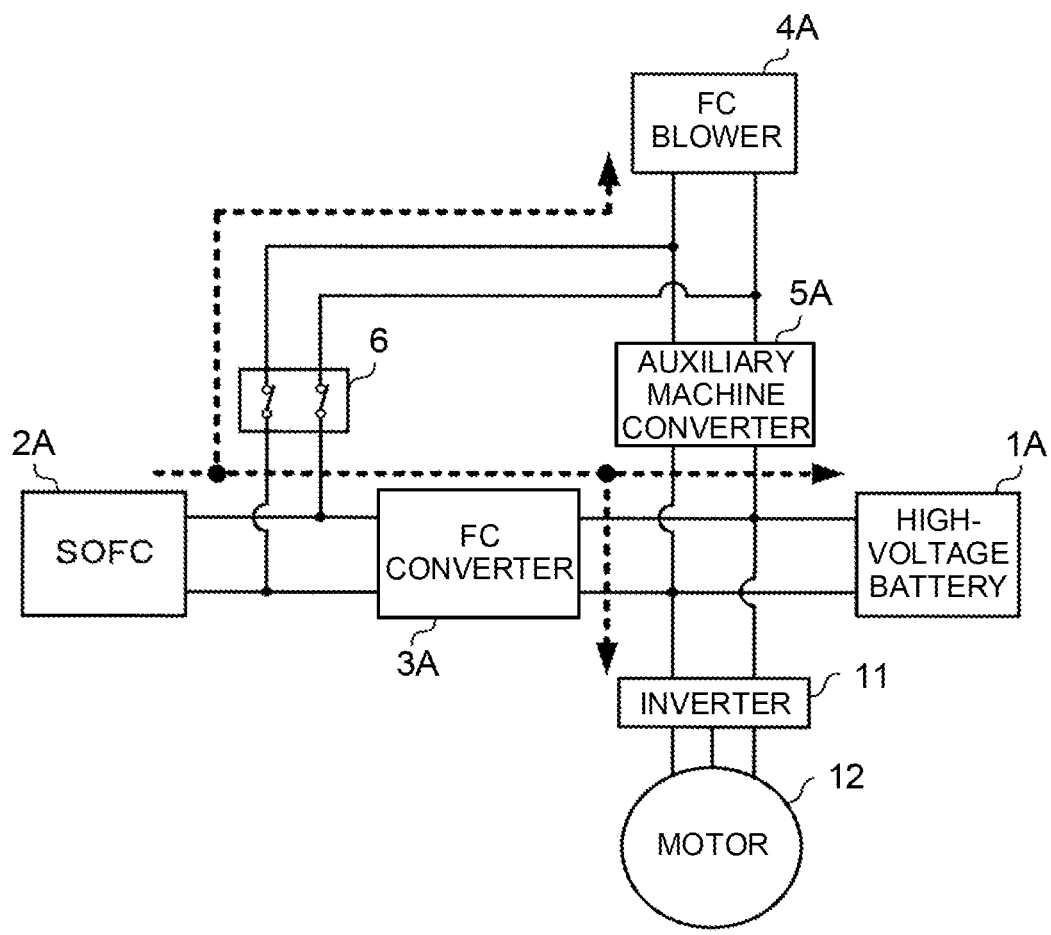
FIG. 4E shows a fifth auxiliary machine feeding state when the voltage across the fuel cell is in the operating voltage range of the auxiliary machine to directly supply the output power from the fuel cell to the auxiliary machine and indirectly supply the output power to other devices via the converter.

FIG. 4E describes the power feeding state to the FC blower 4A when the SOFC 2A becomes ready for rated operation.

In FIG. 4E, following a determination by the controller 7 that the SOFC 2A is ready for rated operation based on the temperature, the IV characteristics, or the like of the SOFC 2A, the controller 7 changes the switch 6 from the disconnection state to the connection state. This directly supplies the output voltage from the SOFC 2A to the FC blower 4A.

Then the auxiliary machine converter 5A stops and the FC converter 3A starts to operate. The FC converter 3A then extracts an externally requested power, which is obtained by subtracting the required power of the FC blower 4A from the output power of the SOFC 2A, from the SOFC 2A, and supplies the power to the high-voltage battery 1A and the motor 12.

In this way, the SOFC 2A directly connects to the FC blower 4A with the switch 6, and this can shorten the time to supply power to the FC blower 4A via the FC converter 3A and the auxiliary machine converter 5A as shown in FIG. 4D. This reduces the power loss at the FC converter 3A and the auxiliary machine converter 5A due to the voltage conversion, and so reduces the consumption of fuel gas during the voltage conversion. This improves the fuel consumption in the vehicle system 101.

Figure 5:
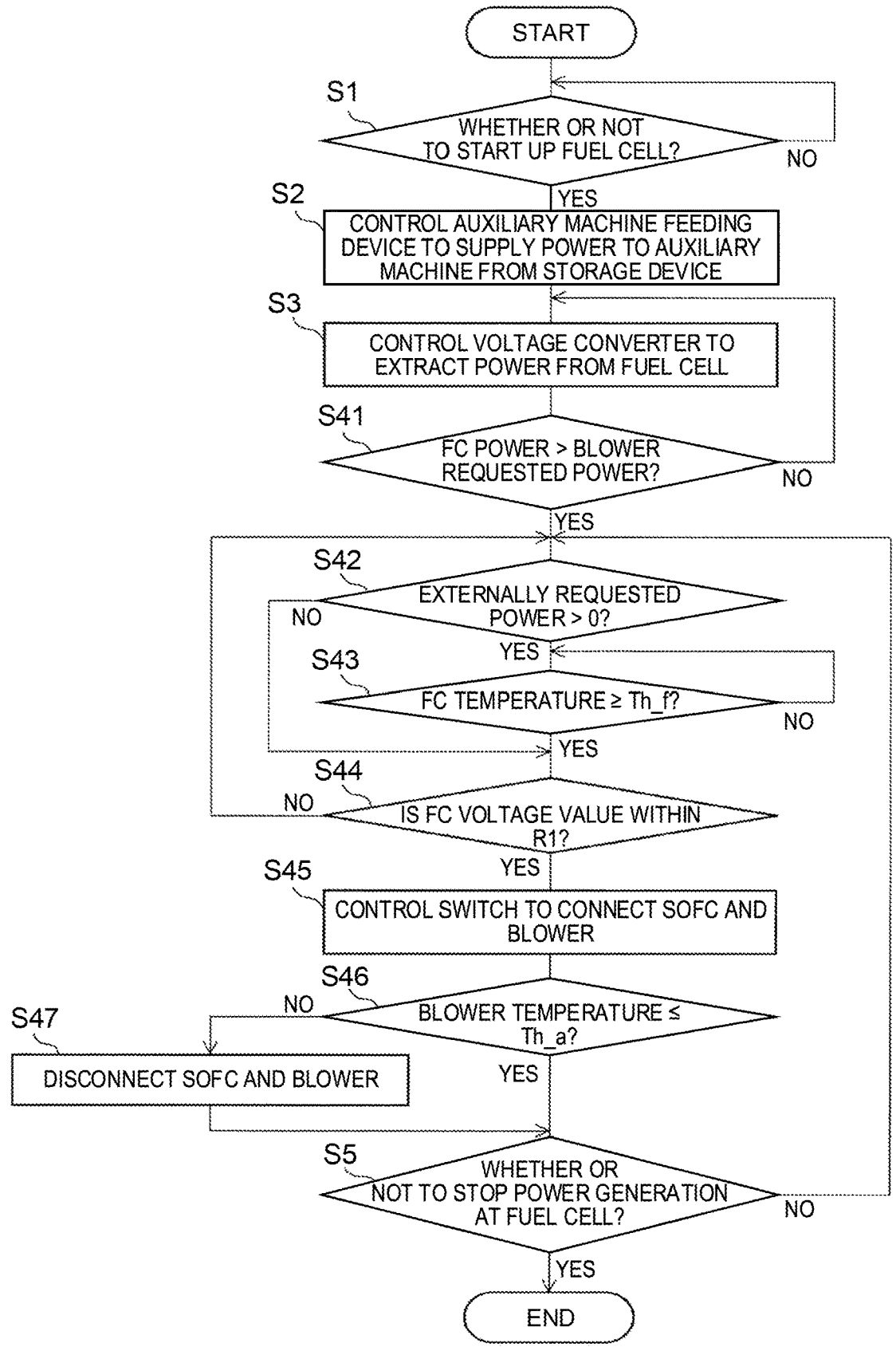
FIG. 5 is a flowchart showing an example of the procedure for the control method of a vehicle system.

FIG. 5 is a flowchart showing an example of the procedure for the control method of the vehicle system 101 by the controller 7 of the present embodiment.

The control method of the present embodiment includes step S41 to step S47 instead of step S4 in steps S1 to S5 shown in FIG. 2. Since the steps other than step S4 are similar to those described in FIG. 2, the following describes only step S41 to step S47 in details.

At step S41, the controller 7 determines whether the FC power indicating the magnitude of output power from the SOFC 2A exceeds the blower requested power indicating the magnitude of the requested power of the FC blower 4A. The controller 7 repeats step S3 until the FC power exceeds the blower requested power.

The FC power is calculated based on at least one of the current and the voltage detected by the FC output sensor 2B, for example. The blower requested power is calculated based on the target generation power of the SOFC 2A. For instance, the requested power of the motor 12 increases with the displacement of the accelerator pedal, and the target generation power of the SOFC 2A also increases. The flow rate of air to be supplied to the SOFC 2A accordingly increases, so that the requested power for the FC blower 4A increases.

At step S42, the controller 7 determines whether the externally requested power of the fuel cell system is greater than 0 or not. The externally requested power refers to the power required for the SOFC 2A from a load other than the FC blower 4A making up the fuel cell system. The externally requested power in the present embodiment equals the sum of the power required to charge the high-voltage battery 1A and the requested power from the motor 12.

At step S43, when the externally requested power is greater than 0, the controller 7 determines whether the FC temperature indicating the temperature of the SOFC 2A is equal to or larger than a temperature threshold $Th\_f$ or not. The FC temperature is detected by the FC temperature sensor 2C, for example. The temperature threshold $Th\_f$ may be determined beforehand based on experimental data or simulation results, for example. The temperature threshold $Th\_f$ of the present embodiment is set at the temperature of the SOFC 2A where the SOFC 2A is ready for rated operation.

The controller 7 may set, as the temperature threshold $Th\_f$, a temperature of the SOFC 2A such that the operating state of the SOFC 2A is able to output the externally requested power in addition to the blower requested power. In this way the controller 7 changes the temperature threshold $Th\_f$ in accordance with the externally requested power, and this allows the output terminal of the SOFC 2A to directly connect to the power-supply terminal of the FC blower 4A at an early stage.

When the FC temperature is lower than the temperature threshold $Th\_f$ at step S43, the controller 7 monitors the FC temperature until the FC temperature reaches the temperature threshold $Th\_f$. When the FC temperature reaches the temperature threshold $Th\_f$, the controller 7 shifts to step S44. Also when it is determined at step S42 that the externally requested power is 0, the controller 7 shifts to step S44.

At step S44, the controller 7 determines whether the FC voltage value, which indicates the magnitude of the output voltage from the SOFC 2A, is within the operating voltage range R1 of the FC blower 4A or not. The FC voltage value is detected by the FC output sensor 2B, for example. The operating voltage range R1 indicates the range of voltage values where the FC blower 4A making up the auxiliary machine of the SOFC 2A can run. The operating voltage range R1 is described later with reference to the following drawing.

When the FC voltage value is not within the operating voltage range R1, the controller 7 returns to step S42 and repeats step S42 to step S44 until the FC voltage value fits within the operating voltage range R1.

At step S45, when the FC voltage value is within the operating voltage range R1, the controller 7 controls the state of the switch 6 so as to connect the SOFC 2A and the FC blower 4A. This directly supplies the output power from the SOFC 2A to the FC blower 4A as shown in FIG. 4E, and this therefore can avoid the flowing of the power of the SOFC 2A through the FC converter 3A and the auxiliary machine converter 5A as shown in FIG. 4D. This reduces the power loss due to the voltage conversion at the FC converter 3A and the auxiliary machine converter 5A.

The controller 7 then stops the operation of the auxiliary machine converter 5A, and changes the feeding switch 5B disposed between the auxiliary machine converter 5A and the switch 6 to the disconnection state. Such a feeding switch 5B avoids the countercurrent flowing into the SOFC 2A even when the smoothing capacitor in the auxiliary machine converter 5A has a voltage higher than the voltage across the SOFC 2A, and so the switch 6 changes to the connection state.

At step S46, the controller 7 determines whether the blower temperature, which indicates the temperature of the drive motor making up the FC blower 4A, is equal to or less than an auxiliary machine temperature threshold $Th\_a$ or not. The blower temperature is detected by the temperature sensor 4B, for example.

The auxiliary machine temperature threshold $Th\_a$ as stated above may be determined beforehand based on a temperature of the drive motor of the FC blower 4A when the drive motor deteriorates or the operating efficiency of the drive motor is lowered, i.e., based on a temperature of the drive motor when the load on the FC blower 4A is too large. In this way, the temperature of the drive motor in the FC blower 4A may be detected, and this precisely estimates the overloading of the FC blower 4A. This suppresses deterioration of the magnetic characteristics and the operating efficiency of the drive motor.

At step S47, when the blower temperature exceeds the auxiliary machine temperature threshold $Th\_a$, the controller 7 determines that the FC blower 4A is in an overloading state, and controls the switch 6 so as to disconnect the SOFC 2A and the FC blower 4A. Then the controller 7 controls both of the FC converter 3A and the auxiliary machine converter 5A so as to keep the supply power to the FC blower 4A. This avoids a failure of the FC blower 4A.

At step S46, when the blower temperature is equal to or less than the auxiliary machine temperature threshold $Th\_a$ or when the switch 6 changes from the connection state to the disconnection state at step S47, the controller 7 shifts to step S5. The controller 7 then repeats steps S42 to S47 and step S5 until the controller receives a stop request for the SOFC2A.

Figure 6:
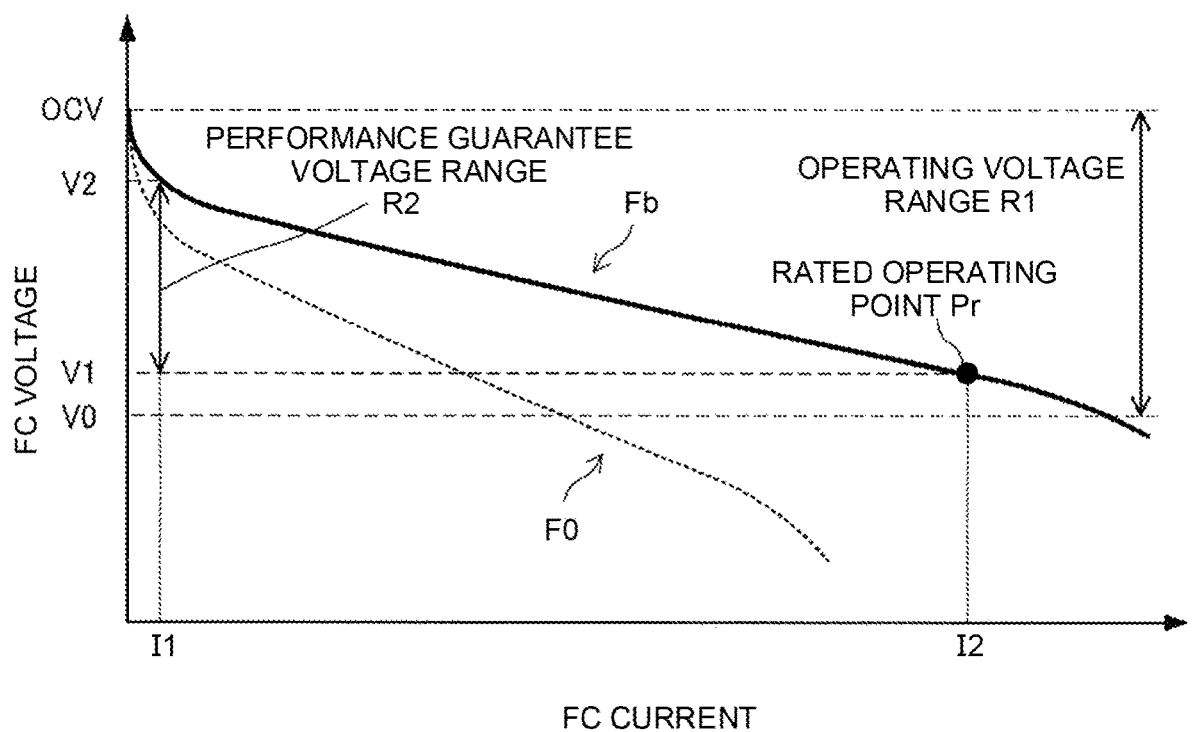
FIG. 6 shows the relationship between the output characteristics of the fuel cell and the operating voltage range of the auxiliary machine.

FIG. 6 shows the relationship between the IV characteristics of the SOFC 2A and the voltage range of the FC blower 4A.

In FIG. 6, reference output characteristics Fb as the reference of the IV characteristics at which the SOFC2A is ready for rated operation are indicated with the solid line, and the output characteristics F0 as a failure with reference to the reference output characteristics Fb of the SOFC 2A are indicated with the dotted line.

FIG. 6 also shows the operating voltage range R1 and the performance guarantee voltage range R2 that are voltage ranges of the FC blower 4A. The operating voltage range R1 indicates the range of voltage values where the FC blower 4A is operable. In one example, the open-circuit voltage OCV is 50V, and the lower-limit voltage for operation V0 is 30 V. The performance guarantee voltage range R2 indicates the range of voltage values where the FC blower 4A is ready for rated operation.

The reference output characteristics Fb show the output current of the SOFC2A that increases with a decrease in output voltage of the SOFC 2A. At the rated operating point Pr of the SOFC 2A, the FC blower 4A operates at the rated conditions. This means that, when the output power from the SOFC 2A is supplied to the FC blower 4A via the switch 6, the output voltage from the SOFC 2A is the rated voltage value V1, and when the output current from the SOFC 2A is the rated current value I2, the FC blower 4A operates at the rated conditions.

The output characteristics F0 are failure relative to the reference output characteristics Fb, so that the SOFC2A in this state fails to operate at the rated conditions. In one example, when the temperature of the SOFC 2A is lower than temperatures suitable for power generation, the IV characteristics of the SOFC 2A are lower than the reference output characteristics Fb.

In this way the operating voltage range R1 of the FC blower 4A may be determined beforehand while considering the IV characteristics of the SOFC 2A so that the FC blower 4A directly connecting to the SOFC2A operates.

According to the second embodiment of the present invention, the vehicle system 101 includes the SOFC 2A that is a solid oxide fuel cell configured to receive fuel gas and generate power. Since the SOFC 2A is mainly made of ceramics, the SOFC 2A tends to have a larger variation than that of a solid polymer fuel cell. An increased number of the fuel cells in the lamination of the SOFC 2A therefore leads to a larger variation of the SOFC 2A as a whole and degrades the adhesiveness of the fuel cells to increase the electrical resistance inside of the SOFC 2A.

To avoid this, the number of the fuel cells in the lamination of the SOFC 2A is limited, so that the rated output of the SOFC 2A is smaller than the rated output of the high-voltage battery 1A. The rated output of the FC blower 4A as an auxiliary machine of the SOFC 2A also can be set smaller, and so the operable voltage range of the FC blower 4A can be easily set for the output voltage from the SOFC 2A. This therefore suppresses deterioration of the fuel consumption of the SOFC 2A with a simple configuration.

The vehicle system 101 of the present embodiment includes, as sensors to detect the power-generation state of the SOFC 2A, the FC output sensor 2B to detect the current and the voltage of the SOFC 2A and the FC temperature sensor 2C to detect the temperature of the SOFC 2A. The vehicle system 101 also includes the controller 7 to control the connection state of the switch 6 based on the FC output sensor 2B or the FC temperature sensor 2C. The controller 7 controls the switch 6 based on a detection signal of the FC output sensor 2B or the FC temperature sensor 2C so as to connect and disconnect the FC blower 4A making up the auxiliary machine of the fuel cell and the SOFC 2A.

This directly supplies the output power from the SOFC 2A to the FC blower 4A in accordance with the power-generating state of the SOFC 2A, and so reduces the amount of the output power from the SOFC 2A that is consumed during the voltage conversion at the FC converter 3A and the auxiliary machine converter 5A.

The FC output sensor 2B of the present embodiment detects the output voltage or the output current from the SOFC 2A as the power-generating state of the SOFC 2A. When the output power from the SOFC 2A based on the voltage value of the current value detected by the FC output sensor 2B exceeds the requested power from the FC blower 4A, the controller 7 connects the SOFC 2A and the FC blower 4A.

In one example, the controller 7 may omit steps S42 to S44 among steps S41 to S45 shown in FIG. 5, and when the controller 7 determines that the FC power is larger than the blower requested power, the controller 7 may change the switch 6 from the disconnection state to the connection state. In another example, when the detected value of the output current from the SOFC 2A exceeds a current value required to keep the blower requested power, or when the detected value of the output voltage from the SOFC 2A exceeds a voltage value required to keep the blower requested power, the controller 7 may change the switch 6 to the connection state.

In this way, the detected value of the current or the voltage output from the SOFC 2A may be used, and this correctly changes the switch 6 to the connection state as compared with the case of using an estimated value of the output current or the output voltage from the SOFC 2A. This therefore reduces the power loss at the FC converter 3A and the auxiliary machine converter 5A.

When it is determined that the FC power is equal to or less than the blower requested power, then the controller 7 changes the switch 6 to the disconnection state. In this way, when the output power from the SOFC 2A does not reach the requested power from the FC blower 4A, the controller 7 disconnects the SOFC 2A and the FC blower 4A. This reduces the power loss at the FC converter 3A and the auxiliary machine converter 5A while keeping the power to be supplied to the FC blower 4A.

The FC temperature sensor 2C of the present embodiment detects the temperature of the SOFC 2A as the power-generating state of the SOFC 2A, and the controller 7 determines whether the temperature detected by the FC temperature sensor 2C is equal to or larger than the predetermined temperature threshold Th_f or not. In one example, the controller 7 may omit step S44 among steps S43 to S45 shown in FIG. 5, and when the FC temperature indicating the temperature detected by the FC temperature sensor 2C is equal to or larger than the temperature threshold Th_f, the controller 7 may connect the SOFC2A and the FC blower 4A.

Such a detection of the temperature of the SOFC 2A enables a determination about whether the SOFC 2A is ready for rated operation or not, and the controller 7 therefore sets the switch 6 at the connection state while keeping the SOFC 2A ready for the rated operation. This avoids the shortage of the output power from the SOFC 2A due to an increase in the requested power from the power storage device 1 or the motor 12 after setting the switch 6 at the connection state.

When the FC temperature is less than the temperature threshold Th_f, the controller 7 disconnects the SOFC2A and the FC blower 4A. This keeps the power to be supplied to the FC blower 4A.

The controller 7 may be configured to obtain the IV characteristics indicating the output characteristics of the output voltage versus the output current from the SOFC 2A based on voltage values and current values detected by the FC output sensor 2B, and may determine whether the obtained IV characteristics are favorable or not with reference to predetermined reference output characteristics Fb.

In one example, the controller 7 changes the output power from the SOFC 2A in a stepwise fashion while controlling the FC converter 3A to supply power extracted from the SOFC 2A to the FC blower 4A. The controller 7 then obtains a set of a current value and a voltage value from the FC output sensor 2B every time the controller 7 changes the output power from the SOFC 2A in a stepwise fashion, and applies at least two sets of the current values and the voltage values to a predetermined approximate expression to estimate the IV characteristics.

When the controller 7 determines that the estimated IV characteristics are favorable, then the controller 7 connects the SOFC and the FC blower 4A. Such an estimation of the IV characteristics of the SOFC 2A allows precise determination about whether the SOFC 2A is ready for rated operation or not, and the controller 7 therefore sets the switch 6 at the connection state while keeping the SOFC 2A ready for the rated operation. This avoids the shortage of the output power from the SOFC 2A.

When the controller 7 determines that the estimated IV characteristics are not favorable, then the controller 7 disconnects the SOFC and the FC blower 4A. This avoids the shortage of the output from the SOFC 2A, and keeps the power to be supplied from the high-voltage battery 1A to the FC blower 4A.

As shown in step S44 in FIG. 5, when the voltage value detected by the FC output sensor 2B fits within the operating voltage range R1 of the FC blower 4A, the controller 7 of the present embodiment connects the SOFC and the FC blower 4A. This avoids the overloading state of the FC blower 4A because the voltage value supplied to the FC blower 4A is low.

The present embodiment includes the fuel cell that is the SOFC 2A having the upper-limit value less than 60 V. This enables the negative-electrode terminal of the SOFC 2A to be grounded to the chassis, and lowers the necessity of insulating the SOFC 2A from the chassis. This reduces the manufacturing cost and the size of the vehicle system 101.

As shown in FIG. 4E, when the SOFC2A and the FC blower 4A connects via the switch 6, the controller 7 of the present embodiment lowers the output from the FC converter 3A to keep the output voltage from the SOFC 2A constant.

For instance, the controller 7 lowers the power output from the FC converter 3A so that the output power of the SOFC 2A detected by the FC output sensor 2B is kept constant, and stops the operation of the auxiliary machine converter 5A. Alternatively the controller 7 may lower the output power from the FC converter 3A by the amount obtained by adding the consumed power at the FC blower 4A to the sum of the power loss at the FC converter 3A and the auxiliary machine converter 5A.

This avoids deterioration of the fuel cells making up the SOFC 2A or an instable power-generating state of the SOFC 2A, which results from the excessively extraction of power from the SOFC 2A during changing from the disconnection state to the connection state of the switch 6.

The vehicle system 101 of the present embodiment includes, as an auxiliary machine sensor to detect the operating state of the auxiliary machine, the temperature sensor 4B to detect the temperature of the FC blower 4A. The controller 7 then disconnects the SOFC 2A and the FC blower 4A in accordance with a detection signal output from the temperature sensor 4B. This enables a determination about whether the FC blower 4A can generate a malfunction or not, and so avoids a failure of the FC blower 4A during changing of the switch 6 to the connection state.

Especially the controller 7 determines based on the temperature detected by the temperature sensor 4B whether the load at the FC blower 4A is excessive or not. When the controller 7 determines that the load is excessive, then the controller 7 disconnects the SOFC 2A and the FC blower 4A. This avoids lowering of the output from the FC blower 4A or emergency stop of the FC blower 4A because the temperature of the FC blower 4A is too high.

The vehicle system 101 of the present embodiment includes the FC blower 4A as the actuator to supply gas required for power generation at the SOFC 2A to the SOFC 2A. The temperature sensor 4B detects the temperature of the drive motor to drive the FC blower 4A. The temperature of the drive motor increases with higher load on the FC blower 4A, so that the controller 7 is able to estimate the overloading state of the FC blower 4A.

The vehicle system 101 may include, as the sensor to detect the operating state of the FC blower 4A, a current sensor to detect the magnitude of the current supplied to the FC blower 4A, for example, instead of the temperature sensor 4B. In such a configuration, the controller 7 determines whether the load at the FC blower 4A is excessive or not based on the current detected by such a current sensor. When the controller 7 determines that the load is excessive, then the controller 7 disconnects the SOFC 2A and the FC blower 4A. This estimates a failure of the FC blower 4A precisely as compared with the configuration including the temperature sensor 4B.

Third Embodiment

Figure 7:
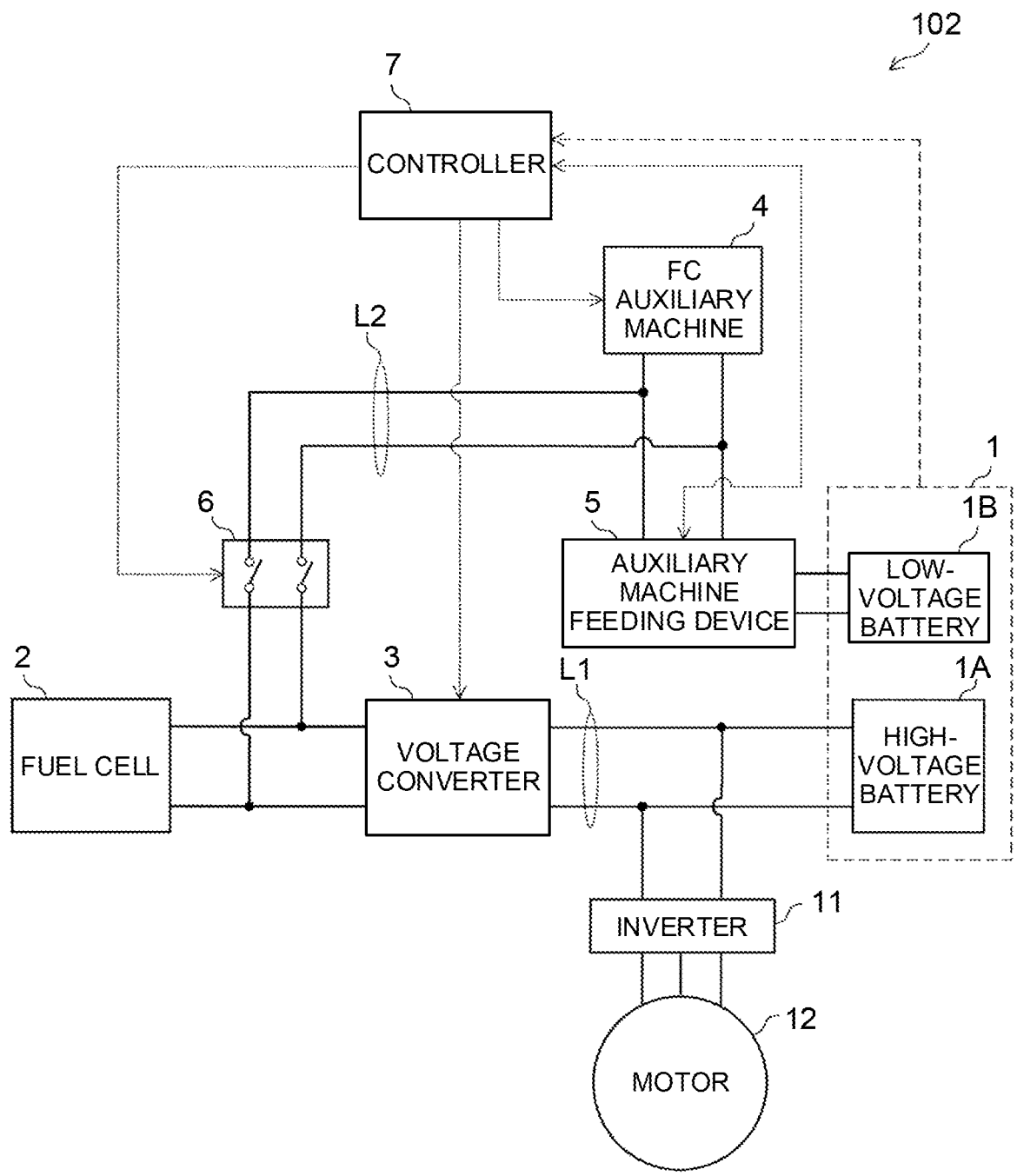
FIG. 7 shows an example of the configuration of a vehicle system in a third embodiment of the present invention.

FIG. 7 shows an example of the configuration of a vehicle system 102 in a third embodiment of the present invention.

The vehicle system 102 includes a high-voltage battery 1A and a low-voltage battery 1B that correspond to the power storage device 1 in the vehicle system 100 shown in FIG. 1. The other configuration is the same as in the vehicle system 100, and so the following assigns the same reference numerals and omits the descriptions.

As described above referring to FIG. 2, the high-voltage battery 1A outputs a voltage higher than the output voltage from the fuel cell 2. The high-voltage battery 1A of the present embodiment supplies power to the motor 12 to drive the vehicle. In one example, the high-voltage battery 1A outputs a DC voltage at about 400 V.

The low-voltage battery 1B outputs a voltage lower than the output voltage from the high-voltage battery 1A. In one example, the low-voltage battery 1B outputs a voltage at a dozen of V. The low-voltage battery 1B includes a lithium ion battery, a lead battery or the like.

Unlike the connection shown in FIG. 3, the high-voltage battery 1A of the present embodiment does not connect to the auxiliary machine power supplying device 5, and connects to the motor 12 via the inverter 11. The low-voltage battery 1B connects to the auxiliary machine power supplying device 5.

Compared with the configuration to supply power to both of the FC auxiliary machine 4 and the motor 12 from the single high-voltage battery 1A, this configuration avoids the shortage of supplied power to the FC auxiliary machine 4 when the requested power from the motor 12 increases steeply.

The auxiliary machine power supplying device 5 of the present embodiment includes a diagnostic sensor to diagnose whether the auxiliary machine power supplying device 5 itself is out of order or not. The controller 7 changes the switch 6 from the disconnection state to the connection state in accordance with a detection signal of the diagnostic sensor.

Examples of the diagnostic sensor include a sensor to detect a temperature of a semiconductor device in a DC/DC converter making up the auxiliary machine power supplying device 5, and a sensor to detect the current and the voltage on the primary side and the secondary side. When a detected value of the voltage, the current, the temperature and the like of the auxiliary machine power supplying device 5 exceeds a predetermined threshold, the controller 7 determines that the auxiliary machine power supplying device 5 is out of order, and changes the switch 6 from the disconnection state to the connection state.

This supplies power from the fuel cell 2 to the FC auxiliary machine 4, and so the fuel cell 2 does not need to stop power generation because of a failure of the auxiliary machine power supplying device 5. This enables continuous power supply from the fuel cell 2 to the high-voltage battery 1A or the motor 12.

The power storage device 1 further includes a sensor to detect the voltage, the current, the temperature and the like of the low-voltage battery 1B. When the voltage, the current, the temperature and the like of the low-voltage battery 1B exceeds a predetermined threshold, the controller 7 determines that the low-voltage battery 1B is out of order, and changes the switch 6 from the disconnection state to the connection state. With this configuration, the fuel cell 2 does not need to stop power generation because of a failure of the low-voltage battery 1B, and so this enables continuous power supply from the fuel cell 2 to the high-voltage battery 1A or the motor 12.

According to the third embodiment of the present invention, the high-voltage battery 1A connects to the motor 12, and the low-voltage battery 1B connects to the auxiliary machine power supplying device 5. This avoids the shortage of the output power supplied to the FC auxiliary machine 4 due to a rapid increase in the requested power from the motor 12.

The controller 7 of the present embodiment detects the operating state of the auxiliary machine power supplying device 5 and determines whether the auxiliary machine power supplying device 5 is out of order or not. When the controller 7 determines that the auxiliary machine power supplying device 5 is out of order, the controller 7 connects the fuel cell 2 and the FC auxiliary machine 4.

With this configuration, even when the auxiliary machine power supplying device 5 is out of order, the fuel cell 2 supplies power to the FC auxiliary machine 4. The power at the fuel cell 2 therefore can be supplied to the motor 12 and the high-voltage battery 1A without stopping power generation at the fuel cell 2.

The above embodiments of the present invention are merely a part of examples of the application of the present invention, and the technical scope of the present invention is not limited to the specific constitutions of the above embodiments.

In one example, the second embodiment describes the example where the blower to supply air to the fuel cell 2 operates as the FC auxiliary machine 4, and the present invention is not limited to this configuration. In another example, the FC auxiliary machine 4 may be a blower to supply hydrogen or ethanol used for power generation at the fuel cell. When the fuel cell 2 is a solid polymer fuel cell, the FC auxiliary machine 4 may be a pump to supply refrigerant to the fuel cell 2. Such a device leads to the same advantageous effects as those described in the above embodiments.

In the above embodiments, the power supply system described in FIG. 1 is mounted on a vehicle. The power supply system may be mounted on an airplane or a ship other than vehicles, or may be mounted on power-supply facility that is not a movable body.

The embodiments as stated above may be combined as appropriate.

The invention claimed is:
1. A power supply system comprising:
a power storage device;
a fuel cell connecting to the power storage device, the fuel cell having an output power lower than an output power of the power storage device;
an auxiliary machine of the fuel cell, the auxiliary machine operating in a range corresponding to a voltage across the fuel cell;
a voltage converter inserted along a first line between the fuel cell and the power storage device;
a power supply device for the auxiliary machine connecting to the voltage converter and the power storage device, the power supply device for the auxiliary machine being configured to supply power from at least one of the fuel cell and the power storage device to the auxiliary machine; and
a switch inserted along a second line different from the first line between the fuel cell and the auxiliary machine, the switch being configured to supply power to the auxiliary machine.

2. The power supply system according to claim 1, further comprising:
a sensor configured to detect a power-generating state of the fuel cell; and
a controller configured to control a state of the switch based on the sensor, wherein
the controller configured to connect or disconnects the fuel cell and the auxiliary machine via the switch in accordance with a detection signal output from the sensor.

3. The power supply system according to claim 2, wherein
the sensor detects a voltage or a current of the fuel cell as the power-generating state, and
when output power from the fuel cell exceeds requested power from the auxiliary machine based on the voltage or the current detected by the sensor, the controller configured to connect the fuel cell and the auxiliary machine.

4. The power supply system according to claim 3, wherein
when output power from the fuel cell does not exceed requested power from the auxiliary machine, the controller configured to disconnect the fuel cell and the auxiliary machine.

5. The power supply system according to claim 2, wherein
the sensor detects a temperature of the fuel cell as the power-generating state, and
when the temperature detected by the sensor is equal to or larger than a predetermined threshold, the controller configured to connect the fuel cell and the auxiliary machine.

6. The power supply system according to claim 5, wherein
when the temperature detected by the sensor is less than the predetermined threshold, the controller configured to disconnect the fuel cell and the auxiliary machine.

7. The power supply system according to claim 2, wherein
the sensor detects a voltage and a current of the fuel cell as the power-generating state, and
the controller configured to obtain IV characteristics of the fuel cell based on the power-generating state of the fuel cell, and determines whether the IV characteristics are favorable or not relative to predetermined reference characteristics, and when the controller determines the obtained IV characteristics are favorable, the controller configured to connect the fuel cell and the auxiliary machine.

8. The power supply system according to claim 7, wherein
when the controller determines that the obtained IV characteristics are not favorable relative to the reference characteristics, the controller configured to disconnect the fuel cell and the auxiliary machine.

9. The power supply system according to claim 2, wherein the sensor detects a voltage of the fuel cell as the power-generating state, and
when the voltage detected by the sensor is within the range of the voltage where the auxiliary machine is operable, the controller configured to connect the fuel cell and the auxiliary machine.

10. The power supply system according to claim 2, wherein
when the fuel cell and the auxiliary machine connect, the controller configured to lower an output from the voltage converter so as to keep power output from the fuel cell constant.

11. The power supply system according to claim 2, further comprising
an auxiliary machine sensor configured to detect an operating state of the auxiliary machine, wherein
the controller configured to disconnect the fuel cell and the auxiliary machine in accordance with a detection signal output from the auxiliary machine sensor.

12. The power supply system according to claim 11, wherein
the auxiliary machine sensor detects a temperature of the auxiliary machine as the operating state, and
the controller determines whether load at the auxiliary machine is excessive or not based on the temperature detected by the auxiliary machine sensor, and when the controller determines that the load is excessive, the controller configured to disconnect the fuel cell and the auxiliary machine.

13. The power supply system according to claim 11, wherein
the auxiliary machine sensor detects a current supplied to the auxiliary machine as the operating state, and
the controller determines whether load at the auxiliary machine is excessive or not based on the current detected by the auxiliary machine sensor, and when the controller determines that the load is excessive, the controller configured to disconnect the fuel cell and the auxiliary machine.

14. The power supply system according to claim 11, wherein
the auxiliary machine includes an actuator configured to supply gas required for power generation to the fuel cell, and
the auxiliary machine sensor detects an operating state of a motor to drive the actuator.

15. The power supply system according to claim 2, wherein
the power storage device includes a high-voltage battery configured to output a voltage higher than a voltage across the fuel cell, and a low-voltage battery configured to output a voltage lower than the voltage across the high-voltage battery, and
the high-voltage battery connects to a motor to drive a vehicle, and the low-voltage battery connects to the power supply device for the auxiliary machine.

16. The power supply system according to claim 15, wherein
the controller determines whether the power supply device for the auxiliary machine is out of order or not, and when the controller determines that the power supply device for the auxiliary machine is out of order, the controller configured to connect the fuel cell and the auxiliary machine.

17. The power supply system according to claim 1, wherein
the fuel cell includes a solid oxide fuel cell configured to receive fuel and generate power, and
and the fuel cell has an upper-limit voltage less than 60 V.

18. A control method for a power supply system including: a power storage device; an auxiliary machine of a fuel cell, the fuel cell connecting to the power storage device and having an output power lower than an output power of the power storage device, the auxiliary machine operating in a range corresponding to a voltage across the fuel cell; a voltage converter inserted between the fuel cell and the power storage device; and an power supply device for the auxiliary machine configured to convert a voltage between the voltage converter and the power storage device and supply the voltage to the auxiliary machine, the control method comprising
connecting the fuel cell and the auxiliary machine to change power to be supplied from the power supply device for the auxiliary machine to the auxiliary machine into power output from the fuel cell.

\* \* \* \* \*